(12) United States Patent
Weigt

(10) Patent No.: US 10,774,762 B2
(45) Date of Patent: Sep. 15, 2020

(54) PURGE PUMP SYSTEM WITH EMERGENCY STOP

(71) Applicant: Hella GmbH & Co. KGaA, Lippstadt (DE)

(72) Inventor: Florian Weigt, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/491,178

(22) PCT Filed: Mar. 6, 2017

(86) PCT No.: PCT/EP2017/055167
§ 371 (c)(1),
(2) Date: Sep. 5, 2019

(87) PCT Pub. No.: WO2018/162029
PCT Pub. Date: Sep. 13, 2018

(65) Prior Publication Data
US 2020/0032725 A1    Jan. 30, 2020

(51) Int. Cl.
| | | |
|---|---|---|
| F02D 41/00 | (2006.01) | |
| F02M 37/50 | (2019.01) | |
| F02D 41/20 | (2006.01) | |
| F02M 25/08 | (2006.01) | |
| H02P 3/12 | (2006.01) | |
| H02P 6/24 | (2006.01) | |
| F02D 41/22 | (2006.01) | |

(52) U.S. Cl.
CPC ....... *F02D 41/004* (2013.01); *F02D 41/0032* (2013.01); *F02D 41/20* (2013.01); *F02D 41/22* (2013.01); *F02M 25/08* (2013.01); *F02M 25/089* (2013.01); *F02M 25/0818* (2013.01); *F02M 37/50* (2019.01); *H02P 3/12* (2013.01); *H02P 6/24* (2013.01)

(58) Field of Classification Search
CPC ...... F02D 41/004; F02M 25/0818; H02P 3/12
See application file for complete search history.

(56) References Cited

U.S. PATENT DOCUMENTS

| | | | | |
|---|---|---|---|---|
| 4,823,751 A * | 4/1989 | Pfalzgraf | ............... | F02D 11/107 123/198 DB |
| 5,033,428 A * | 7/1991 | Sasaki | .................... | B60K 28/14 123/198 D |
| 5,048,479 A * | 9/1991 | Bartke | ................ | F02D 35/0007 123/198 D |

(Continued)

*Primary Examiner* — Kevin R Steckbauer
(74) *Attorney, Agent, or Firm* — Husch Blackwell LLP

(57) ABSTRACT

A purge pump system of a vehicle is provided for purging C—H-gas of a tank system to an induction line of a combustion engine of the vehicle. A purge pump and gas connection lines connect the purge pump with the tank system and the induction line. A brushless DC motor and a control unit are also provided. The brushless DC motor comprises a rotor and a stator. The control unit is configured for providing the brushless DC motor with a commutative current to effect a relative rotation of the rotor to the stator. The purge pump system further comprises a shutdown unit for receiving an enable-signal of the vehicle via an enable signal line. The shutdown unit is configured to short-circuit the brushless DC motor as a response to a loss of the enable signal.

10 Claims, 3 Drawing Sheets

(56) References Cited

U.S. PATENT DOCUMENTS

| | | | | |
|---|---|---|---|---|
| 5,291,578 A | * | 3/1994 | Kalami | F02D 41/22 123/497 |
| 5,313,923 A | * | 5/1994 | Takeuchi | F02D 41/3082 123/198 DB |
| 5,345,915 A | * | 9/1994 | Schmitz-Huebsch | F02D 41/222 123/198 D |
| 5,738,063 A | * | 4/1998 | Pfuhl | F02B 77/088 123/198 D |
| 5,890,474 A | * | 4/1999 | Schnaibel | F02M 25/0818 123/520 |
| 5,975,160 A | * | 11/1999 | Rush | B67D 7/3218 137/885 |
| 6,223,714 B1 | * | 5/2001 | Anderson | B60K 28/14 123/198 D |
| 6,354,261 B1 | * | 3/2002 | Lassiter | B60K 28/14 123/198 D |
| 6,848,298 B2 | * | 2/2005 | Miyahara | F02M 25/0818 702/51 |
| 6,877,488 B2 | * | 4/2005 | Washeleski | B60K 15/03504 123/41.31 |
| 6,932,055 B2 | * | 8/2005 | Rado | F02D 11/105 123/352 |
| 7,055,505 B2 | * | 6/2006 | Washeleski | B60K 15/03504 123/519 |
| 7,055,640 B2 | * | 6/2006 | Cook | B60K 28/14 180/274 |
| 7,086,493 B2 | * | 8/2006 | Knight | F02D 41/22 123/497 |
| 7,347,177 B2 | * | 3/2008 | Tippy | F02D 41/22 123/198 DB |
| 7,377,253 B2 | * | 5/2008 | Washeleski | B60K 15/03504 123/198 D |
| 8,217,603 B2 | * | 7/2012 | Akama | H02P 6/06 318/400.01 |
| 8,739,605 B2 | * | 6/2014 | McLain | F02M 25/0809 73/37 |
| 9,470,164 B2 | * | 10/2016 | Baur | B60K 28/14 |
| 9,677,512 B2 | * | 6/2017 | Dudar | F02M 25/0809 |
| 9,694,769 B2 | * | 7/2017 | Namuduri | B60R 16/033 |
| 9,989,018 B2 | * | 6/2018 | Dudar | F02D 41/0042 |
| 10,415,511 B2 | * | 9/2019 | Makino | F02D 13/0234 |
| 2003/0131655 A1 | * | 7/2003 | Miyahara | F02M 25/0818 73/37 |
| 2003/0221675 A1 | * | 12/2003 | Washeleski | F02M 25/089 123/497 |
| 2004/0123837 A1 | * | 7/2004 | Rado | F02D 35/025 123/350 |
| 2004/0178013 A1 | * | 9/2004 | Knight | F02D 41/22 180/274 |
| 2005/0051376 A1 | * | 3/2005 | Cook | B60K 28/14 180/284 |
| 2005/0178365 A1 | * | 8/2005 | Washeleski | B60K 15/03504 123/478 |
| 2005/0236213 A1 | * | 10/2005 | Hosoya | B60K 28/14 180/284 |
| 2006/0225709 A1 | * | 10/2006 | Washeleski | B60K 15/03519 123/478 |
| 2007/0233360 A1 | * | 10/2007 | Hill | F02D 19/0665 701/123 |
| 2007/0240684 A1 | * | 10/2007 | Tippy | F02D 41/406 123/497 |
| 2008/0253899 A1 | * | 10/2008 | Nakanishi | F02M 37/50 417/44.11 |
| 2009/0187327 A1 | * | 7/2009 | Grant | F02D 41/3082 701/103 |
| 2011/0080127 A1 | * | 4/2011 | Akama | H02P 6/06 318/400.21 |
| 2012/0097252 A1 | * | 4/2012 | McLain | F02M 25/0809 137/1 |
| 2012/0288378 A1 | * | 11/2012 | Al-Jafar | F02M 25/08 417/14 |
| 2013/0300325 A1 | * | 11/2013 | Aizawa | H02P 6/24 318/400.11 |
| 2014/0093400 A1 | * | 4/2014 | Baur | B60K 28/14 417/53 |
| 2014/0375118 A1 | * | 12/2014 | Namuduri | B60R 16/033 307/9.1 |
| 2016/0319776 A1 | * | 11/2016 | Dudar | F02M 25/0809 |
| 2016/0333834 A1 | * | 11/2016 | Ohrt | F02M 37/18 |
| 2017/0198662 A1 | * | 7/2017 | Dudar | F02M 25/0836 |
| 2018/0347511 A1 | * | 12/2018 | Makino | F02D 41/0032 |

\* cited by examiner

PURGE PUMP SYSTEM WITH EMERGENCY STOP

CROSS REFERENCE

This application claims priority to PCT Application No. PCT/EP2017/055167, filed 6 Mar. 2017, the entirety of which is hereby incorporated by reference.

FIELD OF THE INVENTION

The invention relates to a Purge pump system of a vehicle for purging C—H-gas of a tank system to an induction line of a combustion engine of the vehicle. The invention further relates to a vehicle with a combustion engine and a purge pump system as well as to a method for operating a purge pump system of a vehicle.

BACKGROUND

Vehicles with a combustion engine comprise a tank system for storing liquid fuel. For such fuel tank systems, evaporation of hydrocarbon gas within the tank system is an issue. By means of an activated carbon filter, evaporated hydrocarbon gas of the tank system is bound. The tank system further comprises a duct line, for forwarding the hydrocarbons to an induction line for providing the combustion engine with filtered oxygen mixed with the hydrocarbons. Generally, the transport of the hydrocarbons from the active carbon filter to the combustion engine is evoked by a negative pressure within the induction line. For controlling a volumetric flow of the hydrocarbons, a purge valve is provided between the induction line and the active carbon filter.

In some cases, the negative pressure of the induction line is not big enough for assuring a predetermined volumetric flow of the hydrocarbons. In order to overcome this drawback, a purge pump is provided between the active carbon filter and the purge valve. The purge pump is configured for the suction of fresh air via a separate air duct line through the active carbon filter, wherein, by these means, the fresh air is mixed with the hydrocarbons within the active carbon filter. The purge pump is further configured for the transport of the hydrocarbon-air-mixture to the induction line of the combustion engine. Generally, the purge pump is configured as a continuously operating pump, forwarding the hydrocarbon-air-mixture with a constant or at least substantially constant volumetric flow. In this case, the volumetric flow is still controlled by the purge valve. This has the advantage that a tank system architecture without such purge pump just needs minor adjustment for the integration of a purge pump. For ensuring a reliable continuous operation of the purge pump, standard purge pumps are operated by a brushless DC motor.

Besides the afore-mentioned advantages, the usage of a tank system architecture comprising a purge pump with a brushless DC motor has a major disadvantage. When a connection between a brushless DC motor and a control unit for controlling or operating the brushless DC motor is interrupted, due to mass inertia of an impeller of the purge pump, the brushless DC motor usually will continue spinning for a short period. In case of an accident, the purge pump would continue pumping explosive fluid towards the combustion engine or—in case the duct line is broken or detached from the purge pump or the induction line—the explosive fluid could possibly be pumped into the motor compartment, a rear compartment or the like of the vehicle.

SUMMARY OF THE INVENTION

It is therefore an object of the present invention, to provide a purge pump system that overcomes the drawbacks of the known purge pump systems. In particular, it is an object of the present invention, to provide a purge pump system that enables an emergency stop of the brushless DC motor of the purge pump in case a connection between the control unit and the brushless DC motor is interrupted.

This object is solved by the patent claims. In particular, this object is solved by a purge pump system according to independent claim 1, a vehicle with a combustion engine according to independent claim 9 and a method for operating a purge pump system of a vehicle according to independent claim 10. Further features and details of the invention are comprised in the dependent claims, the description and the drawings. In this context, features and details being described with respect to the inventive purge pump system are certainly valid for the inventive vehicle as well as the inventive method and the other way round. Therefore, with respect to the disclosure, reference can and will be made mutually between the different aspects of the invention.

According to a first aspect of the invention, the object is solved by a purge pump system of a vehicle for purging C—H-gas of a tank system to an induction line of a combustion engine of the vehicle. The purge pump system comprises a purge pump and gas connection lines for connecting the purge pump with the tank system and the induction line. The purge pump system further comprises a brushless DC motor and a control unit, wherein the brushless DC motor comprises a rotor and a stator, wherein the control unit is configured for providing the brushless DC motor with a commutative current to effect a relative rotation of the rotor to the stator. According to the invention, the purge pump system further comprises a shutdown unit for receiving an enable-signal of the vehicle via an enable signal line, wherein the shutdown unit is configured to short-circuit the brushless DC motor as a response to a loss of the enable signal.

A pump inlet of the purge pump is connected to the tank system, especially to the tank of the vehicle, by a first gas connection line. Thus, C—H-gas of the tank can be sucked into the purge pump. Preferably, the tank system comprises an active carbon filter for binding the C—H-gas of the tank. The active carbon filter is preferably interconnected in between the tank and the pump inlet via the first gas connection line. Furthermore, it is preferred that the tank system comprises an air inlet with an air filter and an air duct for connecting the air filter with the active carbon filter. Thus, filtered air can be mixed with the C—H-gas and sucked into the purge pump. A pump outlet of the purge pump is connected via a second gas connection line to the induction line of the combustion engine of the vehicle. Preferably, the purge pump system comprises a purge valve. The purge valve is preferably interconnected in between the pump outlet and the induction line via the second gas connection line. By these means, the purge pump can be operated in a continuous mode while a flow of C—H-gas can be controlled by the purge valve.

The purge pump comprises a brushless DC motor for enabling a continuous operation of the purge pump with little degradation, especially due to friction. By means of the brushless DC motor, a pump unit of the purge pump can be operated to pump fluid from the first gas connection line to the second gas connection line. By these means, C—H-gas from a vapor collection canister, e.g. an active carbon filter, can be pumped towards the induction line. For operating the brushless DC motor, the purge pump system comprises a control unit. The control unit is configured for providing and/or generating the commutative current for effecting the relative rotation of the rotor of the brushless DC motor to the stator of the brushless DC motor.

The shutdown unit is configured for receiving the vehicle's enable signal via the enable signal line and, therefore, to detect a loss of the enable signal. The enable signal is a signal for indicating a normal operation condition of the vehicle. In this regard, a normal operation condition is when a continuous operation of the purge pump is safe. According to the invention, a loss of the enable signal can be understood as a cut-off of the enable signal, e.g. due to a broken wire or the like as a result of a crash. Moreover, a loss of the enable signal could be a change or modulation of the enable signal, indicating that a continuous operation of the purge pump is not safe, e.g. because a fluid line is broken or detached. Therefore, it is preferred that the vehicle is configured to change or modulate the enable signal as a result of a crash, detected by the vehicle. In other words, it is preferred that a loss of supply voltage of the vehicle results in a loss of the enable signal. Alternatively, within the scope of the invention, the supply voltage can be considered as enable signal.

The shutdown unit can be configured such that an enable signal with a predetermined tolerance of a predetermined enable signal is tolerated without short-circuit of the brushless DC motor and a short-circuit will only be initiated when a certain threshold of the enable signal is reached. Thus, slightly changes of the enable signal will not automatically result in a reset of the control unit. The shutdown unit is further configured to short-circuit the brushless DC motor, when a loss of the enable signal is detected by the shutdown unit. Due to short-circuit, the brushless DC motor is stopped immediately and no more fluid is pumped by the purge pump. The enable signal line can be for example a separate data line.

The purge pump system of the invention has the advantage that due to the necessity of an active reception of the enable signal, a safe continuous operation of the purge pump is guaranteed. In case of a loss of the enable signal, e.g. due to a crash of the vehicle, the brushless DC motor can be automatically and quickly stopped by the shutdown unit due to short-circuit by the shutdown unit. The short-circuit can be compared with a brake that actively stops the brushless DC motor. Without short-circuit, when the commutative current is lost, the brushless DC motor would continue spinning a few more seconds and the purge pump would continue pumping explosive fluid towards the combustion engine. Consequently, operation security of the vehicle in a critical situation, like a crash, a defect of a fluid line or the like, is improved significantly.

According to a preferred embodiment of the invention, the brushless DC motor is configured to generate the enable signal from the commutative current provided from the control unit. This means that only when the commutative current of the control unit is received at the brushless DC motor, the enable signal can be provided. According to the invention, to generate the enable signal can be a modulation of a signal provided from the control unit or simply a pass through of the signal provided from the control unit. A loss of the commutative current and/or a broken or detached power line will automatically result in a loss of the enable signal for the shutdown unit and, therefore, in a forced stop of the brushless DC motor due to short-circuit by the shutdown unit. By these means, a subsequent upgrade of a vehicle with an inventive purge pump system is simplified.

It is preferred that the purge pump system comprises a reset unit for receiving the enable signal, wherein the reset unit is configured to initiate a reset of the control unit as a response to a loss of the enable signal. Preferably, the reset unit is configured to receive the enable signal and to detect a loss of the enable signal. Alternatively, the purge pump system can be configured to provide a specific signal to the reset unit in case of a loss of the enable signal. Preferably, the reset unit is directly connected to the control unit in order to quickly initiate the reset of the control unit. A reset unit has the advantage that, since the brushless DC motor has to be stopped due to short-circuit, the control unit can be prevented from further providing the commutative current to the brushless DC motor due to reset of the control unit. Thus, overheat and extensive energy consumption of the brushless DC motor in the short-circuit-state can be prevented.

It is further preferred that the reset unit comprises a first low pass connected to the enable signal line and a reset line of the control unit, wherein the first low pass is configured to block the enable signal from getting to the reset line and to let a signal from the enable signal line through to the reset line as a response to a loss of the enable signal. In other words, the reset unit is interconnected between the reset line and the enable signal line. The enable signal is blocked by the reset unit. Due to the first low pass, the reset unit is configured to pass through the incoming signal in case the enable signal is lost or modulated. The first low pass can be configured such that an enable signal with a predetermined tolerance of a predetermined enable signal is still blocked and a signal is passed through only when a certain threshold of the enable signal is reached. Thus, slightly changes of the enable signal will not automatically result in a reset of the control unit. Preferably, the control unit is configured to reset itself in case a signal—preferably any signal—is received via the reset line. A first low pass has the advantage that an unwanted reset of the control unit is prevented as long as the enable signal is received properly, wherein a reset of the control unit can be initiated when the enable signal is lost, modulated or the like.

Preferably, the control unit comprises a B6-bridge for providing the commutative current to the brushless DC motor, wherein the B6-bridge comprises a plurality of high side MOSFETS and a plurality of low side MOSFETS. B6-bridges are very reliable electronical components for generating a commutative current for a brushless DC motor. Moreover, by means of a B6-bridge, short-circuit of the brushless DC motor can be achieved easily.

According to a preferred embodiment of the invention, the shutdown unit comprises a capacitor that is connected to the brushless DC motor via a diode and configured such that the capacitor is charged during operation of the brushless DC motor and cannot be discharged via the diode to the brushless DC motor. The shutdown unit further comprises a second low pass for connecting the enable signal line with a gate of a PMOS of the shutdown unit. The second low pass is configured to block the enable signal from getting to the gate of the PMOS and to let a signal from the enable signal line through to the gate of the PMOS as a response to a loss of the enable signal. The PMOS is configured to discharge the capacitor to the gates of the low side MOSFETS, when the signal is at the gate of the PMOS. During normal usage of the purge pump, the capacitor is charged, e.g. by a supply voltage of the vehicle or the commutative current provided by the control unit. Preferably, the charging of the capacitor is at least controlled by the control unit. The Diode blocks a reverse current flow from the capacitor towards the brushless DC motor. As long as the enable signal is received, the low pass will block the enable signal towards the gate of the PMOS. A loss, reduction or the like of the enable signal below a predetermined threshold will result in the low pass to let the signal through to the gate of the PMOS. The threshold can be defined e.g. as any signal weaker than the enable signal. Alternatively, the threshold can have a predetermined distance from the enable signal, e.g. a certain intensity lower than the enable signal and below that. The PMOS is configured to discharge the capacitor to the gates of the low side MOSFETS of the B6 bridge when the signal reaches the gate of the PMOS. Thus, the brushless DC motor is short-circuited. This preferred embodiment comprises a hardware solution for providing a secure stopping of the brushless DC motor by short-circuit.

It is preferred that the first low pass and the second low pass are further configured such that as a response to a loss of the enable signal, the first low pass enables forwarding of the signal before the second low pass. This means, that the purge pump system is configures such that as a response to a loss of the enable signal, the reset of the control unit is initiated firstly and the brushless DC motor is short-circuited after that. Preferably, the time distance between the reset of the control unit and the short-circuit of the brushless DC motor is set to a few milliseconds. By these means, an overheat or damage of the brushless DC motor, due to the provision of commutative current in a short-circuit state of the brushless DC motor, can be avoided. By selecting a very short time distance between the reset of the control unit and the short-circuit of the brushless DC motor, in case of a loss of the enable signal, a quick stopping of the brushless DC motor can still be achieved.

Preferably, the purge pump system comprises a pulldown unit, wherein the pulldown unit is configured to pull the enable signal line to ground as a response to a loss of the enable signal. A pulldown unit has the advantage, that by putting the enable signal line of the purge pump system to ground, the enable signal is grounded and changed to a zero signal within instances. As a result, this change is easily detectable by the shutdown unit and the reset unit. Hence, operation of the purge pump system in case of a loss of the enable signal is further improved.

According to a second aspect of the invention, the problem is solved by a vehicle with a combustion engine, a tank system for providing the combustion engine with fuel and an induction line for providing the combustion engine with oxygen. The vehicle comprises a purge pump system according to the invention.

The vehicle has the same advantages over the prior art as previously described with regard to the purge pump system according to the first aspect of the invention. Hence, the vehicle has the advantage that due to the necessity of an active reception of the enable signal, a safe continuous operation of the purge pump is guaranteed. In case of a loss of the enable signal, e.g. due to a crash of the vehicle, the brushless DC motor can be automatically and quickly stopped by the shutdown unit due to short-circuit by the shutdown unit. The short-circuit can be compared with a brake that actively stops the brushless DC motor. Without short-circuit, when the commutative current is lost, the brushless DC motor would continue spinning a few more seconds and the purge pump would continue pumping explosive fluid towards the combustion engine. Consequently, operation security of the vehicle in a critical situation, like a crash, a defect of a fluid line or the like, is improved significantly.

According to a third aspect of the invention, the problem is solved by a method for operating a purge pump system of a vehicle according to the invention. The method comprises the following steps:
  providing an enable signal of the vehicle;
  receiving the enable signal by a shutdown unit and/or a reset unit of the purge pump system;
  detecting a loss of the enable signal by the shutdown unit and/or the reset unit;
  resetting the control unit by the reset unit of the purge pump system; and
  short-circuit a brushless DC motor of a purge pump of the purge pump system by the shutdown unit.

The enable signal is provided via the enable signal line and can be provided by the control unit of the purge pump system or any suitable system of the vehicle. The enable signal is a signal that indicates a normal operation status of the vehicle. In case of shutdown, damages, crash of the vehicle or the like, the enable signal is lost. According to the invention, a loss of the enable signal is understood as a change to a signal with a weaker intensity than the enable signal, a modulation of the enable signal, a complete loss of a signal or the like. During normal operation of the vehicle, the enable signal is received by the shutdown unit and/or the reset unit. The purge pump system can be configured such that information about the loss of the enable signal is exchanged between shutdown unit and reset unit. As long as the enable signal is received, the shutdown unit and reset unit preferably stay inactive. When a loss of the enable signal is detected, the reset unit resets the control unit and the shutdown unit short-circuits the brushless DC motor.

The method according to the invention has the same advantages over the prior art as previously described with regard to the purge pump system according to the first aspect of the invention and the vehicle according to the second aspect of the invention. Hence, the method has the advantage that due to the necessity of an active reception of the enable signal, a safe continuous operation of the purge pump is guaranteed. In case of a loss of the enable signal, e.g. due to a crash of the vehicle, the brushless DC motor is automatically and quickly stopped by the shutdown unit due to short-circuit by the shutdown unit. The short-circuit can be compared with a brake that actively stops the brushless DC motor. Without short-circuit, when the commutative current is lost, the brushless DC motor would continue spinning a few more seconds and the purge pump would continue pumping explosive fluid towards the combustion engine. Consequently, operation security of the vehicle in a critical situation, like a crash, a defect of a fluid line or the like, is improved significantly.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
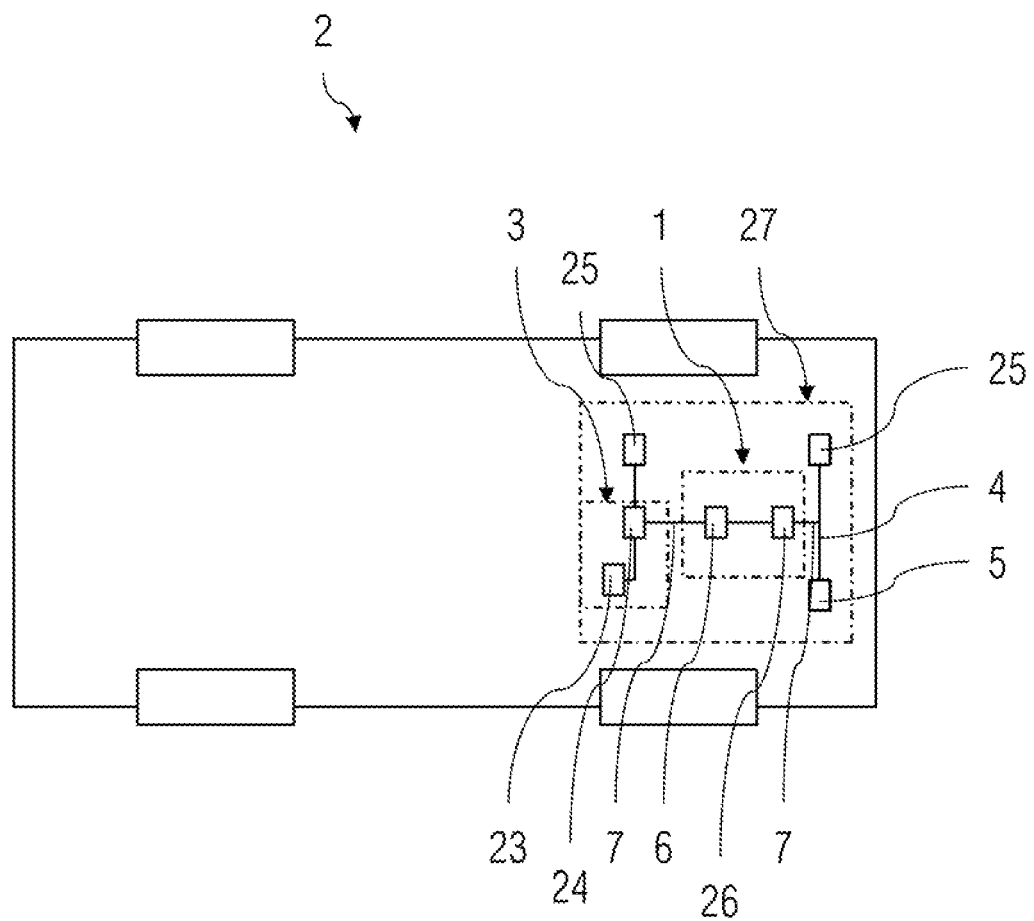
FIG. 1 schematically shows a vehicle according to the invention in a top view.

In FIG. 1 a preferred embodiment of a vehicle 2 according to the invention is schematically illustrated in a top view. The vehicle 2 comprises a combustion engine system 27. The combustion engine system 27 comprises a tank system 3 with a fuel tank 23 and a vapor collection canister in the form of an active carbon filter 24 for binding C—H-gas evading from the tank 23. An air filter 25 of the combustion engine system 27 is connected with the active carbon filter 24 for providing filtered air. The active carbon filter 24 is connected via a gas connection line 7 of the combustion engine system 27 with a purge pump system 1 of the combustion engine system 27. In this figure, just a purge pump 6 and a purge valve 26 of the purge pump system 1 are illustrated. The purge pump system 1 is connected via a gas connection line 7 with an induction line 4 of the combustion engine system 27. One end of the induction line 4 is connected with an air filter 25 for providing filtered air to the induction line 4. Another end of the induction line 4 is connected to a combustion engine 5 of the combustion engine system 27.

Figure 2:
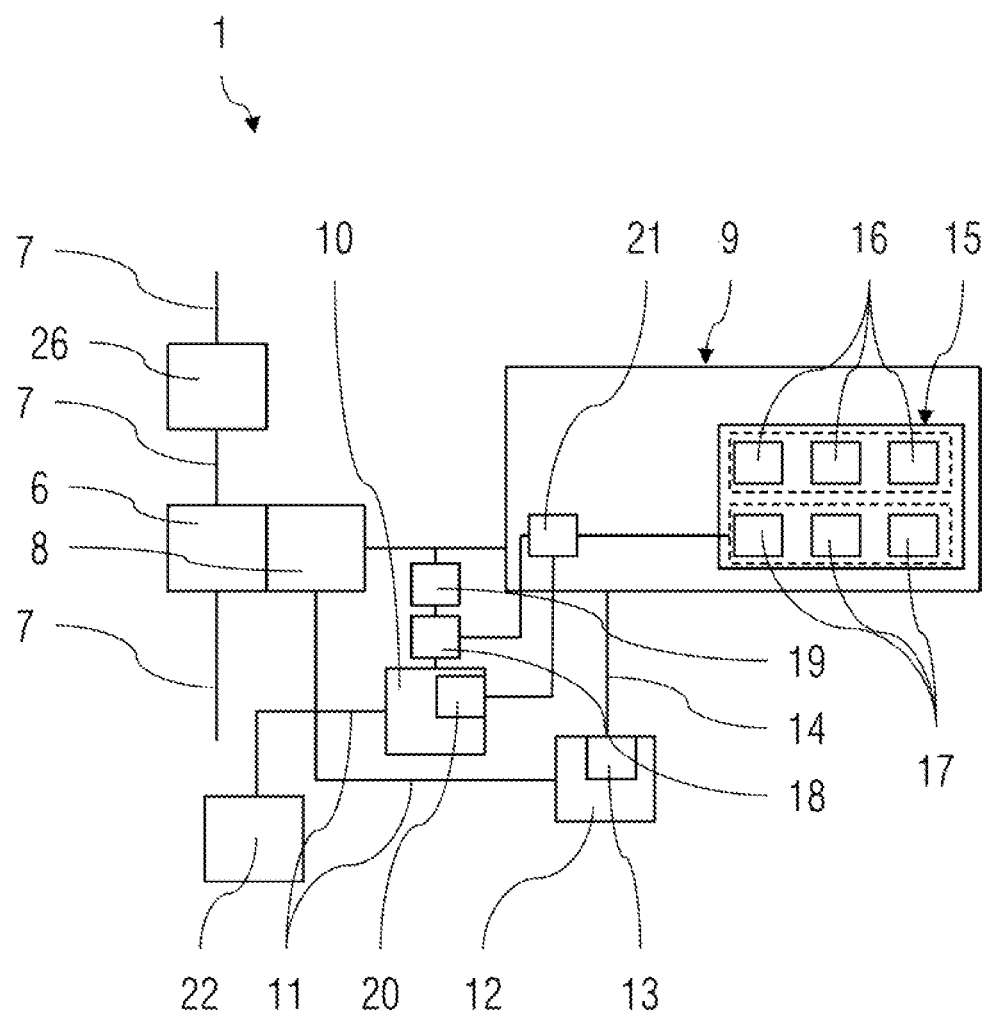
FIG. 2 schematically shows a purge pump system according to the invention.

In FIG. 2, a preferred embodiment of a purge pump system 1 according to the invention is schematically illustrated. The purge pump system 1 comprises a purge pump 6 for pumping C—H-gas from a not shown tank system 3 (c.f. FIG. 1) via a gas connection line 7 and a purge valve 26 of the purge pump system 1 to a not shown induction line 4 (c.f. FIG. 1) of the combustion engine system 27 (c.f. FIG. 1). For pumping the C—H-gas, the purge pump system 1 comprises a brushless DC motor 8. The purge pump system 1 further comprises a control unit 9 for operating the brushless DC motor 8. The control unit 9 comprises a B6-bridge with three high side MOSFETs 16 and three low side MOSFETs 17. The B6-bridge is configured for generating a commutative current for the brushless DC motor 8. In this preferred embodiment, an enable signal line 11 is connected to the brushless DC motor 8 for receiving an enable signal from the brushless DC motor 8. The enable signal line 11 is further connected to a shutdown unit 10, a reset unit 12 and a pulldown unit 22 of the purge pump system 1 for providing the enable signal. The pulldown unit 22 is configured to switch the enable signal line 11 to ground, when the enable signal is lost.

The reset unit 12 comprises a first low pass 13 for blocking the enable signal towards a reset line 14 of the control unit 9. The first low pass 13 is configured for letting a signal pass towards the reset line 14 to reset the control unit 9, in case the enable signal is lost. The purge pump system 1 further comprises a capacitor 18 and a diode 19. The capacitor 18 is configured to be charged by the commutative current of the control unit 9. The diode is configured to prevent a discharge of the capacitor 18 towards the brushless DC engine 8. The shutdown unit 10 comprises a second low pass 20 for blocking the enable signal towards a PMOS 21 of the control unit 9. The first second low pass 20 is configured for letting a signal pass towards a gate of the PMOS 21, in case the enable signal is lost. The PMOS 21 is configured to discharge the capacitor 18 to the low side MOSFETs 17, when the signal is at the gate of the PMOS 21. By these means, the brushless DC motor 8 is in short-circuit.

Figure 3:
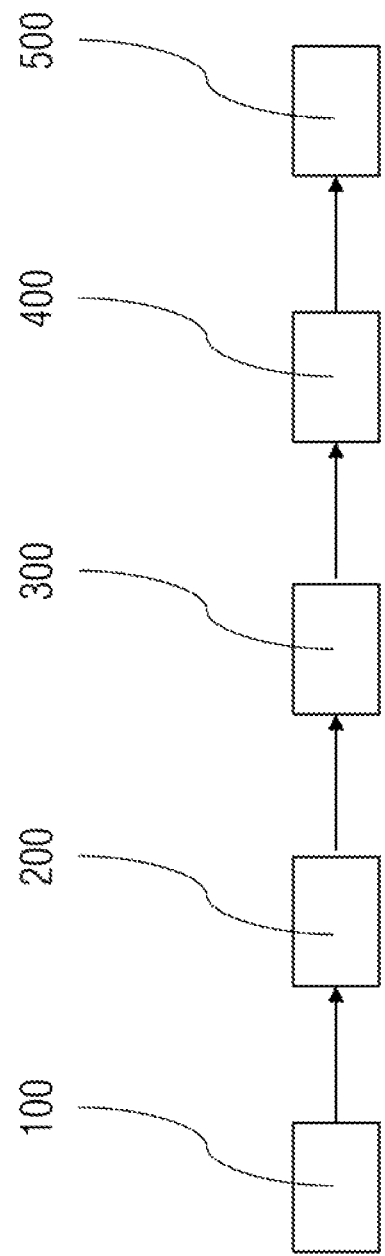
FIG. 3 schematically shows a flow chart of the method according to the invention.

In FIG. 3, a method according to the invention is illustrated in a flow chart. In a first step 100, an enable signal of the vehicle is provided. The enable signal can be provided by the control unit 9 and/or the brushless DC motor 8 and/or another component of the vehicle 2. The enable signal is provided at the enable signal line 11. In a second step 200, the enable signal is received by the shutdown unit 10 and/or the reset unit 12 of the purge pump system 1. Therefore, the shutdown unit 10 and/or the reset unit 12 are connected to the enable signal line 11. As long as the enable signal is received, the shutdown unit 10 and the reset unit 12 block the enable signal from getting towards the control unit 9. In a third step 300, a loss of the enable signal is detected by the shutdown unit 10 and/or the reset unit 12. In a fourth step 400, the control unit 9 is reset by the reset unit 12 of the purge pump system 1. This is done by letting a signal pass the first low pass 13 of the reset unit 12 towards the reset line 14 of the control unit 9. In a fifth step 500, the brushless DC motor 8 of the purge pump 6 of the purge pump system 1 is short-circuit by the shutdown unit 10. This can be done by letting a signal pass through the second low pass 20 of the shutdown unit 10 towards the gate of the PMOS 21 of the control unit 9 for discharging the capacitor 18 towards the low side MOSFETs 17 of the B6-bridge 15 of the control unit 9. Thus, the brushless DC motor 8 is quickly stopped.

REFERENCE LIST 1 purge pump system
2 vehicle
3 tank system
4 induction line
5 combustion engine
6 Purge pump
7 gas connection line
8 brushless DC motor
9 control unit
10 shutdown unit
11 enable signal line
12 reset unit
13 first low pass
14 reset line
15 B6-bridge
16 high side MOSFET
17 low side MOSFET
18 capacitor
19 diode
20 second low pass
21 PMOS
22 pulldown unit
23 tank
24 active carbon filter
25 air filter
26 purge valve
27 combustion engine system
100 first step
200 second step
300 third step
400 fourth step
500 fifth step

The invention claimed is:

1. A purge pump system of a vehicle for purging hydrocarbon gas from a vapor canister of a tank system to an induction line of a combustion engine of the vehicle, the purge pump system comprising:
   a purge pump;
   gas connection lines for connecting the purge pump with the tank system and the induction line, a brushless DC motor comprising a rotor and a stator;

a control unit configured for providing the brushless DC motor with a commutative current to effect a relative rotation of the rotor to the stator; and a shutdown unit for receiving an enable-signal of the vehicle via an enable signal line, wherein the shutdown unit is configured to short-circuit the brushless DC motor as a response to a loss of the enable signal due to an abnormal operating condition.

2. The purge pump system according to claim 1, wherein the brushless DC motor is configured to generate the enable signal from the commutative current provided from the control unit.

3. The purge pump system according to claim 1 further comprising a reset unit for receiving the enable signal, wherein the reset unit is configured to initiate a reset of the control unit as a response to a loss of the enable signal.

4. The purge pump system according to claim 3, wherein the reset unit comprises a first low pass connected to the enable signal line and a reset line of the control unit, wherein the first low pass is configured to block the enable signal from getting to the reset line and to let a second signal from the enable signal line through to the reset line as a response to a loss of the enable signal.

5. The purge pump system according to claim 4 wherein the control unit comprises a B6-bridge for providing the commutative current to the brushless DC motor, wherein the B6-bridge comprises a plurality of high side MOSFETS and a plurality of low side MOSFETS.

6. The purge pump system according to claim 5, wherein the shutdown unit comprises a capacitor that is connected to the brushless DC motor via a diode and configured such that the capacitor is charged during operation of the brushless DC motor and cannot be discharged via the diode to the brushless DC motor, wherein the shutdown unit further comprises a second low pass for connecting the enable signal line with a gate of a PMOS of the shutdown unit, wherein the second low pass is configured to block the enable signal from getting to the gate of the PMOS and to let the second signal from the enable signal line through to the gate of the PMOS as a response to a loss of the enable signal, and wherein the PMOS is configured to discharge the capacitor to the gates of the low side MOSFETS, when the second signal is at the gate of the PMOS.

7. The purge system according to claim 6 wherein the first low pass and the second low pass are further configured such that as a response to a loss of the enable signal, the first low pass enables forwarding of the second signal before the second low pass.

8. The purge pump system according to claim 1 further comprising a pulldown unit configured to pull the enable signal line to ground as a response to a loss of the enable signal.

9. A vehicle with a combustion engine, a tank system for providing the combustion engine with fuel and an induction line for providing the combustion engine with oxygen, wherein the vehicle comprises a purge pump system according to claim 1.

10. A method for operating a purge pump system of a vehicle, which purges hydrocarbon gas from a vapor canister, comprising the following steps:

providing an enable signal of the vehicle;

receiving the enable signal by at least one of a shutdown unit and a reset unit of the purge pump system;

detecting a loss of the enable signal by at least one of the shutdown unit and the reset unit due to an abnormal operating condition;

resetting a control unit by the reset unit of the purge pump system; and short-circuiting a brushless DC motor of a purge pump of the purge pump system by the shutdown unit.

* * * * *